United States Patent [19]

Urban

[11] Patent Number: 4,805,386
[45] Date of Patent: Feb. 21, 1989

[54] BAIL STOP

[75] Inventor: Arthur L. Urban, Wichita, Kans.

[73] Assignee: Wescon Products, Inc., Wichita, Kans.

[21] Appl. No.: 159,303

[22] Filed: Feb. 22, 1988

Related U.S. Application Data

[63] Continuation of Ser. No. 895,357, Aug. 11, 1986, abandoned.

[51] Int. Cl.⁴ ............................................. A01D 75/20
[52] U.S. Cl. .................................... 56/10.8; 180/19.3; 56/11.3
[58] Field of Search ...................... 56/10.5, 10.8, 11.3, 56/11.8; 180/19.3

[56] References Cited

U.S. PATENT DOCUMENTS 4,455,811 6/1984 Beugelsdyk ......................... 56/10.8

Primary Examiner—John Weiss
Attorney, Agent, or Firm—Hovey, Williams, Timmons & Collins

[57] ABSTRACT

A bail stop is provided which, when preferably used as part of a lawnmower control system having a U-shaped bail rotatably coupled with a lawnmower handle, prevents forward rotation of the bail beyond the disengaged position. The bail stop preferably includes a circular body with a central shaft-receiving hole; an integral rotation stop tab circumferentially coupled with the body and extending outwardly and perpendicularly therefrom; and a bail-engaging clip coupled with an extended portion of the body and extending outwardly and perpendicularly therefrom on a side thereof opposed from the tab. The clip and the tab are circumferentially spaced apart. In use, the rotation shaft coupling the bail to the lawnmower handle is received in the rotation hole. A support leg of the bail abuts the clip and the tab abuts the handle when the bail is in the disengaged position thereby preventing further forward rotation of the bail.

3 Claims, 1 Drawing Sheet

U.S. Patent  Feb. 21, 1989  4,805,386
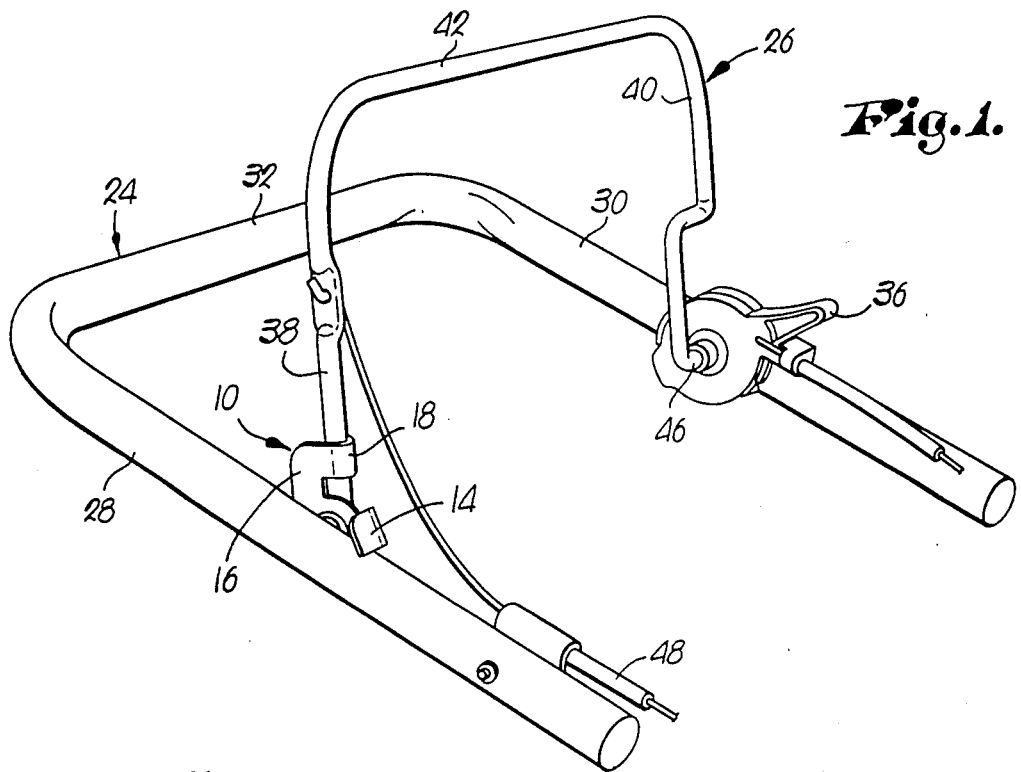
*Fig.1.*
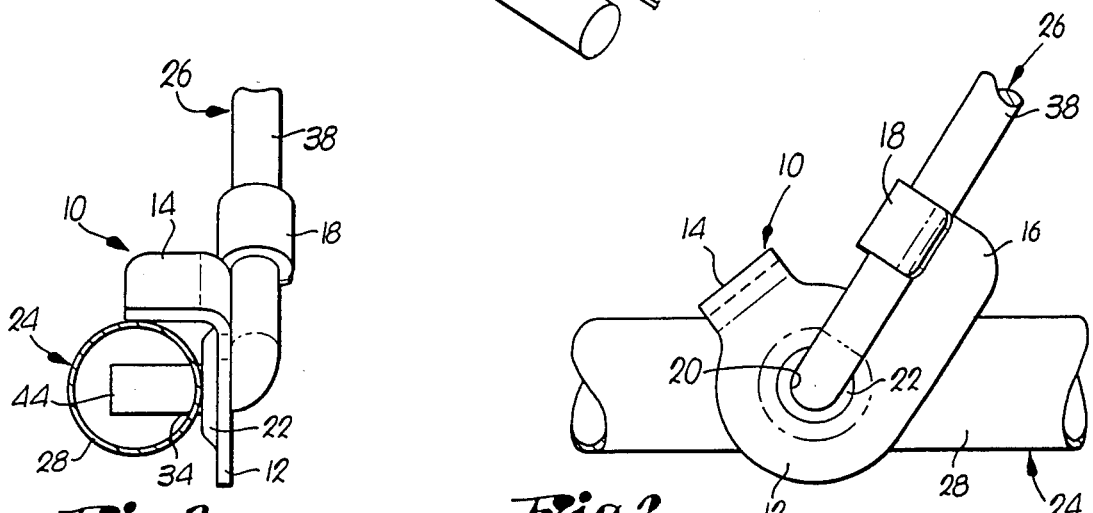
*Fig.3.*  *Fig.2.*
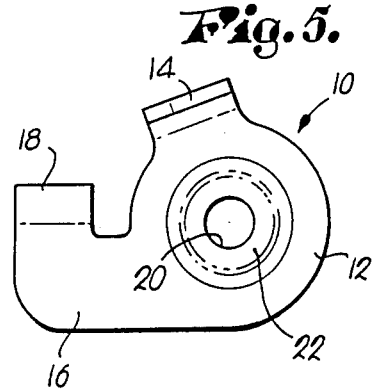
*Fig.5.*
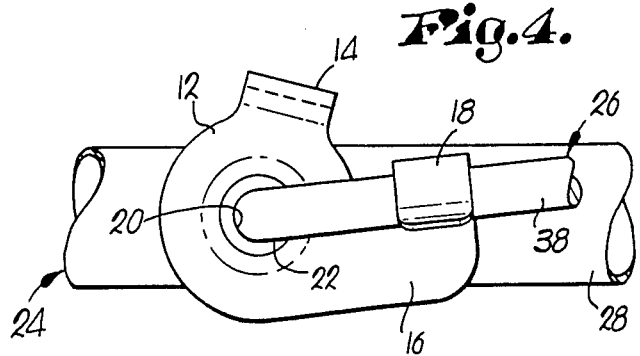
*Fig.4.*

BAIL STOP

This is a continuation of application Ser. No. 895,357 filed on Aug. 11, 1986 now abandoned.

BACKGROUND OF THE INVENTION

1. Field of the Invention

This invention relates to a bail stop which, when used as part of a lawnmower control system having a U-shaped bail rotatably coupled with a lawnmower handle, prevents rotation of the bail beyond a selected position. The configuration of the bail stop eliminates the need for fasteners of any type in order to couple the bail stop with the lawnmower control system. More particularly, this invention relates to a bail stop including a centrally-apertured, planar, circular body having a pair of opposed, outwardly extending, circumferentially spaced-apart projections.

2. Description of the Prior Art

Government regulations among other factors have necessitated inclusion of many safety devices on power lawnmowers. One such safety device is a mower blade control bail rotatably attached to the handle of a lawnmower. The bail is linked to the mower blade clutch control and biased forwardly to a clutch-disengaged position.

To operate the mower the operator must grasp the bail, pull it rearwardly to engage the mower blade clutch, and hold it in this position while operating the lawnmower. When the operator releases the bail, it automatically rotates forwardly to disengage the mower blade clutch which stops rotation of the mower blade. In this way, if the operator loses control of the mower or leaves the mower unattended, the blade stops automatically thus eliminating a potential cause of injury.

In the blade control system as described above using a bail rotatively attached to the lawnmower handle, is it necessary to limit the forward travel of the bail to prevent damage to the control system and to prevent the bail from moving forwardly to an inconvenient position. Known prior art devices limit the forward movement of the bail by the provision of a "bail stop" attached by fasteners to the bail or the handle. The use of fasteners increases the installed cost of bail stop because of additional installation labor, additional parts handling, and higher manufacturing costs. Thus, the known prior art points out the need for a bail stop which is inexpensive to manufacture, requires minimal labor to install, and which reliably limits bail travel.

SUMMARY OF THE INVENTION

The problems outlined above are solved by the bail stop described herein. That is to say, the bail stop is inexpensive to manufacture, quickly installed with minimal labor, and reliably limits rotation of a bail rotatably coupled with a lawnmower handle, all without the use of any fasteners.

The bail stop broadly comprises: a substantially planar and circular body having opposed sides, a rotation hole centrally defined therethrough, and a co-planar extended portion; a rotation stop tab circumferentially coupled with the body and extending outwardly and perpendicularly therefrom; and a bail-engaging clip coupled with the extended portion and extending outwardly and perpendicularly therefrom on the side of the body opposed from the tab, the tab and clip being circumferentially spaced apart. Preferably, the tab lies in a plain normal to a first radius of the body and the clip is U-shaped with an axis therethrough parallel to a second radius of the body. Advantageously, the body, extended portion, tab, and clip are intregrally formed and composed of steel.

The bail stop is advantageously used in combination with a lawnmower handle, a control bail, and a rotation shaft rotatively coupling the handle and the bail. The rotaiton hole of the body receives the rotation shaft therethrough and the bail is rotatable in a forward direction to a disengaged position. In this position, a support leg of the bail abuts the clip, and the tab simultaneously abuts the lawnmower handle to prevent further forward rotation of the bail. Preferably, the bail is biased to the disengaged position and is also rotatable rearwardly toward an operating position in which a cross leg of the bail abuts a cross bar of the handle to prevent further rearward rotation of the bail.

BRIEF DESCRIPTION OF THE DRAWINGS

FIG. 1 is a partial perspective view of a lawnmower control system showing the bail stop in use with a lawnmower handle and control bail;

FIG. 2 is a partial elevational view of the bail stop with the bail in the disengaged position;

FIG. 3 is another partial elevational view of the bail stop in use with the bail in the disengaged position;

FIG. 4 is a side elevational view of the bail stop engaged with the bail in the operating position;

FIG. 5 is a side elevational view of the bail stop.

DESCRIPTION OF THE PREFERRED EMBODIMENT

Bail stop 10 broadly includes planar circular body 12, rotation stop tab 14, body extended portion 16, and U-shaped, bail-engaging clip 18.

Body 12 includes rotation hole 20 centrally defined threrethrough. Preferably that portion of body 12 surrounding hole 20 protrudes outwardly to present a rotation bearing surface 22.

Integral tab 14 extends circumferentially outwardly from body 12 and is disposed perpendicularly to the radius of body 12 extending through the plane of tab 14.

Extended portion 16 is intregal and co-planar with body 12.

Bail-engaging clip 18 is integrally coupled with extended portion 16, extends outwardly but opposed to tab 14, and presents a U-shaped configuration with the radius of curvature defining an axis parallel to an extended radius of body 12.

Body 12, tab 14, extended portion 16, and clip 18 are preferably integrally formed of steel although many other suitable materials would function equivalently such as aluminum or high strength synthetic resin material. Tab 14 and clip 18 are circumferentially spaced apart about body 12 at an angle of about 60 degrees.

Bail stop 10 is advantageously used in combination with a lawnmower handle 24 and a control bail 26.

Lawnmower handle 24 presents a U-shaped configuration and includes arms 28 and 30 integrally intercoupled by cross bar 32. The ends of arms 28 and 30 are coupled with a lawnmower (not shown) according to well known conventional techniques. Additionally, arms 28 and 30 include respective shaft receiving apertures 34 and a second aperture not shown.

Control bail 26 presents a U-shaped configuration and includes support legs 38 and 40 integrally intercoupled by cross leg 42. Preferably, the end portions of legs 38 and 42 are configured to present respective outwardly extending, axially coincident, rotation shafts 44 and 46. Shaft 44 is rotatably received in aperture 34. Shaft 46 is rotatably received in the shaft receiving aperture in arm 30; additionally, lawnmower throttle control 36 is coaxially mount on shaft 46.

Rotation hole 20 of bail stop 10 receives shaft 44 therethrough to couple bail stop 10 between support leg 38 and arm 28. Clip 18 snugly receives a portion of support leg thereby removably fixing bail stop 10 to leg 38. Bearing surface 22 contacts the surface of arm 28 in the vicinity of aperture 34.

In operation, one end of clutch control cable 48 is conventionally attached to bail support leg 38. The other end (not shown) of cable 48 is attached to the mower blade clutch control (not shown). Typically, the clutch control is biased in the disengaged position corresponding to the position of bail 26 shown in FIGS. 1, 2, and 3. In the disengaged position, support leg 38 is snugly held and abuts clip 18; and tab 14 abuts arm 28. In this position, further forward movement (clockwise movement as viewed in FIG. 1) of bail 26 is prevented by the structure of bail stop 10.

Rearward movement of control bail 26 (counter-clockwise as viewed in FIG. 1) moves cross leg 42 into abutting engagement with cross bar 32 which thereby prevents further rearward movement of bail 26. In the rearward most position, that is, the operating position, the action of support leg 38 on control cable 48 causes cable 48 to pull the clutch control into operating engagement against the bias thereof. Release of bail 26 allows it to automatically spring forwardly to the disengaged position due to the bias on cable 48 transmitted to support leg 38. The forward movement of bail 26 is stopped when tab 14 comes into contact with arm 28. Thus, bail stop 10 prevents further forward rotation of bail 26.

As one skilled in the art will appreciate, the specific configuration of bail stop 10 described herein is the preferred configuration for reasons of manufacturing and installation economics and effectiveness. The present invention, however, contemplates other equivalent configurations of bail stop 10. For example, tab 14 could be a laterally extending rod instead of the planar shape preferred. Additionally, clip 18 could also be a rod shaped structure which merely abuts support leg 38 rather than clipping to it.

Additionally, the present invention contemplates uses of bail stop 10 other than that preferred in a lawnmower control system. that is to say, the present invention contemplates a bail stop useful to limit rotational movement of any two rotationally intercoupled structural members.

Having thus described in detail the preferred embodiment of the present invention, what is claimed and desired to be secured by Letters Patent is:

1. A bail stop for use in limiting the forward rotational movement of a control bail or the like relative to a lawnmower handle or the like to which the bail is rotatably coupled, the lawnmower handle presenting an upper surface and a rearward end, the bail including a support leg and a rotation shaft coupled and disposed at a right angle thereto for reception of the shaft in a corresponding rotation aperture defined in an elongated portion of the lawnmower handle whereby the bail is rotatably coupled to the handle, said bail stop comprising:

a central body including means defining a rotation hole therethrough for reception of the bail rotation shaft therein thereby positioning said body between the handle and the support leg, said body presenting a first face disposed toward the handle and second face disposed toward the support leg;

a rotation stop tab coupled with said body and extending outwardly away from said first face for abutting engagement with the upper surface of the handle in order to limit the forward rotation of said bail stop, said tab having an end edge surface oriented for contact with the upper surface of the handle when in said abutting engagement therewith, said tab, when in said engagement, lying in a plane oriented at an oblique angle relative to the longitudinal axis of said elongated portion; and a bail support leg clip coupled with said body, angularly displaced from said tab, and extending outwardly away from said second face, said clip including walls defining a U-shaped configuration and opening toward said rearward end for receiving a portion of the bail support leg therein, said clip including a pair of spaced apart, opposed side walls and an end wall intercoupling said side walls, said portion of the lawnmower handle lying in a first plane, said end wall lying in a second plane generally transverse to said first plane so that said bail support leg portion engages said end wall during forward rotation thereof.

2. The bail stop of claim 1, said body, tab, and clip being integrally formed from a unitary piece of metal.

3. A bail stop for use in limiting the forward rotational movement of a control bail or the like relative to a lawnmower handle or the like to which the bail is rotatably coupled, the lawnmower handle presenting a rearward end, the bail including a support leg and a rotation shaft coupled and disposed at a right angle thereto for reception of the shaft in a corresponding rotation aperture defined in an elongated portion of the lawnmower handle whereby the bail is rotatably coupled to the handle, said bail stop comprising:

a central body including means defining a rotation hole therethrough for reception of the bail rotation shaft therein thereby positioning said body between the handle and the support leg, said body presenting a first face disposed toward the handle and second face disposed toward the support leg;

a rotation stop tab coupled with said body and extending outwardly away from said first face for abutting engagement with the upper surface of the handle in order to limit the forward rotation of said bail stop, said tab having an end edge surface oriented for contact with said handle when in said abutting engagement therewith, said tab, when in said engagement, lying in a plane oriented at an oblique angle relative to the longitudinal axis of said elongated portion; and a bail support leg clip coupled with said body, angularly displaced from said tab, and extending outwardly away from said second face, said clip including walls defining a U-shaped configuration and opening toward said rearward end for receiving a portion of the bail support leg therein, said clip including a pair of spaced apart, opposed side walls and an end wall intercoupling said side walls, said portion of the lawnmower handle lying in a first plane, said end wall lying in a second plane generally transverse to said first plane so that said bail support leg portion engages said end wall during forward rotation thereof.

* * * * *